(No Model.) 4 Sheets—Sheet 1.
C. B. COTTRELL.
CUTTING APPARATUS FOR PRINTING PRESSES.
No. 305,799. Patented Sept. 30, 1884.
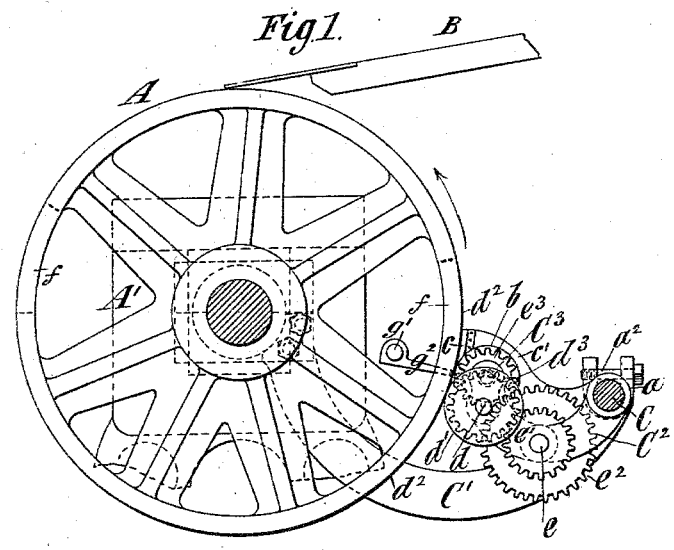
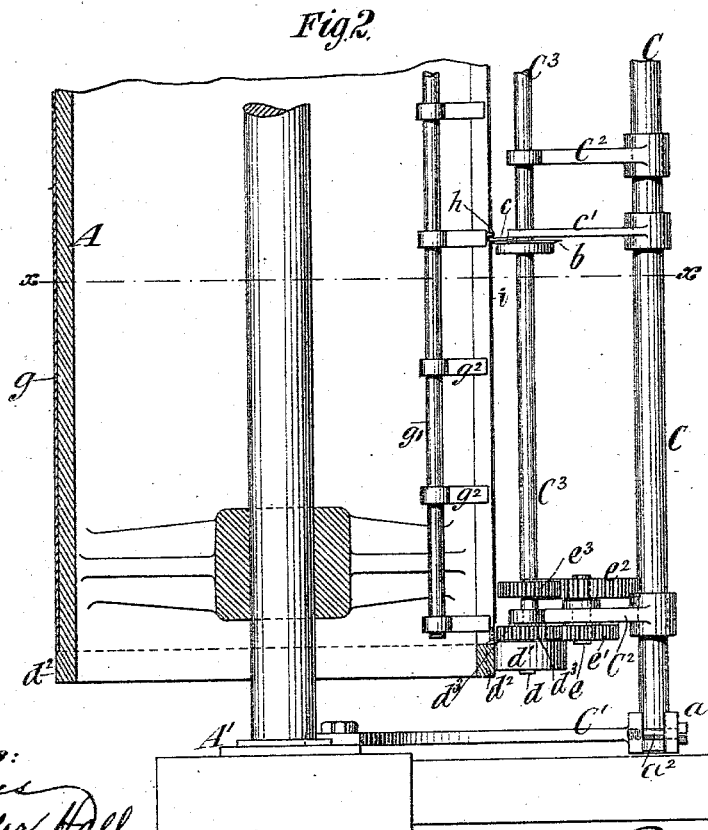
Witnesses:
Inventor:
C. B. Cottrell
by his Attorneys
Brown & Hall
N. PETERS. Photo-Lithographer. Washington, D. C.

(No Model.)  4 Sheets—Sheet 2.

C. B. COTTRELL.
CUTTING APPARATUS FOR PRINTING PRESSES.

No. 305,799.  Patented Sept. 30, 1884.

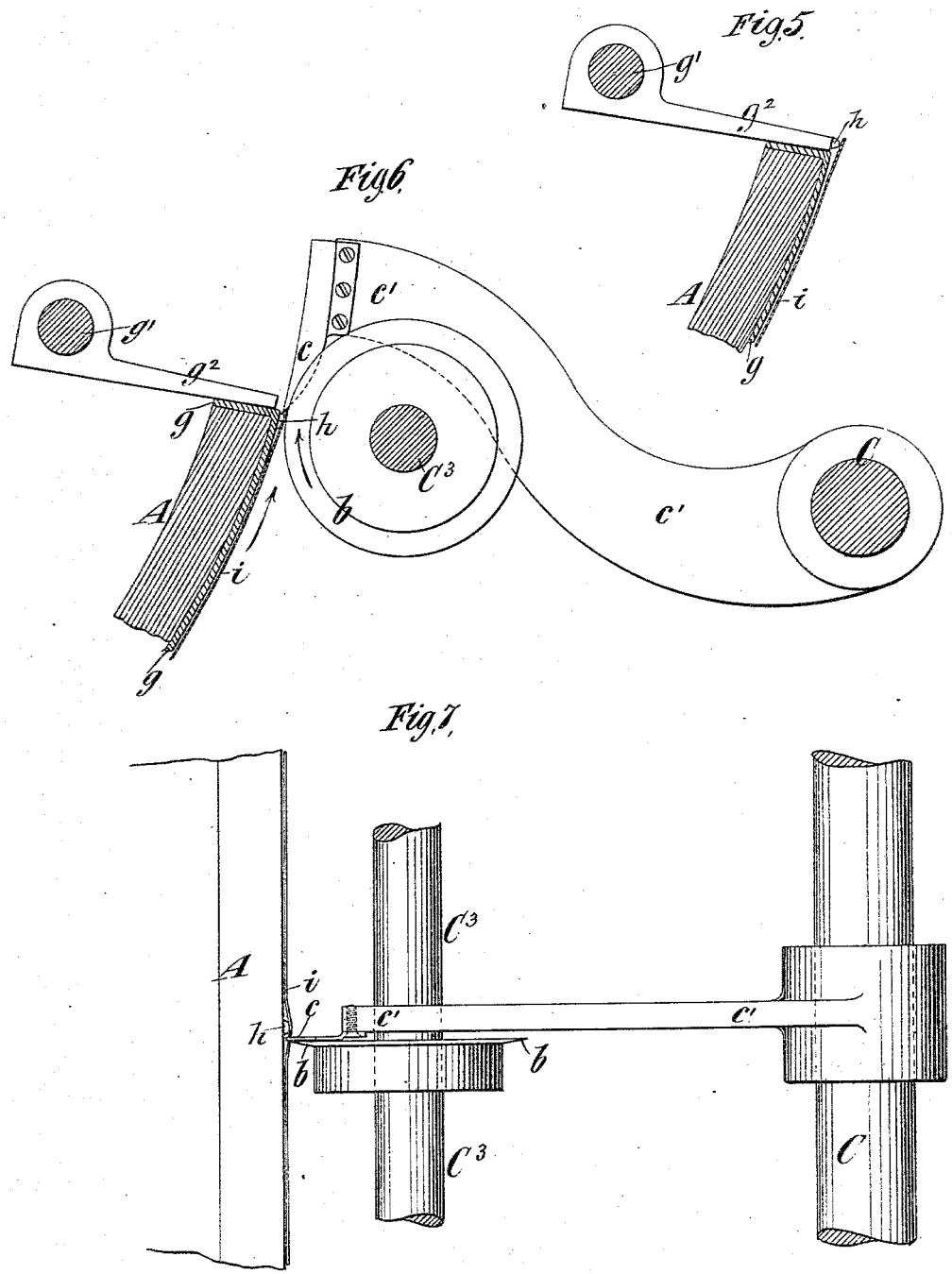

(No Model.) 4 Sheets—Sheet 4.
C. B. COTTRELL.
CUTTING APPARATUS FOR PRINTING PRESSES.
No. 305,799. Patented Sept. 30, 1884.
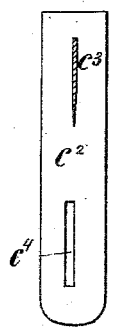
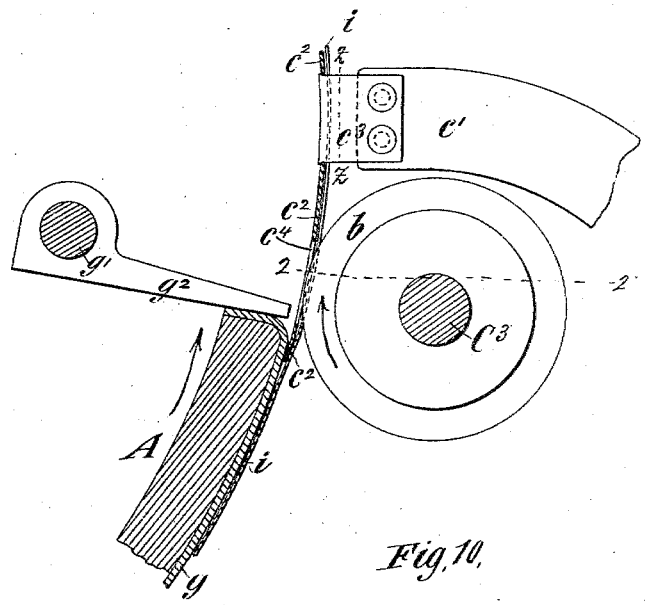
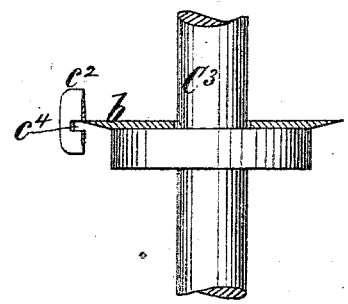

UNITED STATES PATENT OFFICE.

CALVERT B. COTTRELL, OF STONINGTON, CONNECTICUT.

CUTTING APPARATUS FOR PRINTING-PRESSES.

SPECIFICATION forming part of Letters Patent No. 305,799, dated September 30, 1884.

Application filed January 17, 1884. (No model.)

*To all whom it may concern:*

Be it known that I, CALVERT B. COTTRELL, of Stonington, in the county of New London and State of Connecticut, have invented a new and useful Improvement in Cutting Apparatus for Printing-Presses, of which the following is a specification.

My invention relates to apparatus for cutting or slitting printed paper while upon the cylinder of a printing-press and in a direction circumferential to the cylinder.

The invention consists, essentially, in the combination, with a rotating impression-cylinder, of a stationary blade or cutter arranged close to or against the periphery of the cylinder, so that as the cylinder rotates the said blade or cutter will be introduced between the cylinder and the paper thereon, and a rotary blade or cutter, so arranged to act on the paper from the outside thereof and relatively to the first-named blade or cutter that the two will act in conjunction as a pair of shears to cut the paper, leaving it upon the cylinder. The stationary blade or cutter, by its introduction under the paper, raises the paper very slightly from the cylinder and holds it against the edge of the rotary blade or cutter, thereby insuring a clean and smooth shearing action upon it.

The invention also consists in the combination, with a rotary impression-cylinder, of a stationary blade or cutter to be introduced under the paper, and a rotary blade or cutter for acting on the outside of the paper, in conjunction with said stationary cutter or blade, and having its rotary motion in the same direction as the adjacent portion of the cylinder and at greater speed.

The invention also consists in the combination, with a rotary impression-cylinder, of a stationary blade to be introduced flatwise under the paper, and having a vertical slot, and a rotary blade or cutter arranged opposite said slot, for acting on the outside of the paper with a shearing action.

The invention also consists in other novel combinations of parts hereinafter described, and pointed out in the claims.

Figure 3:
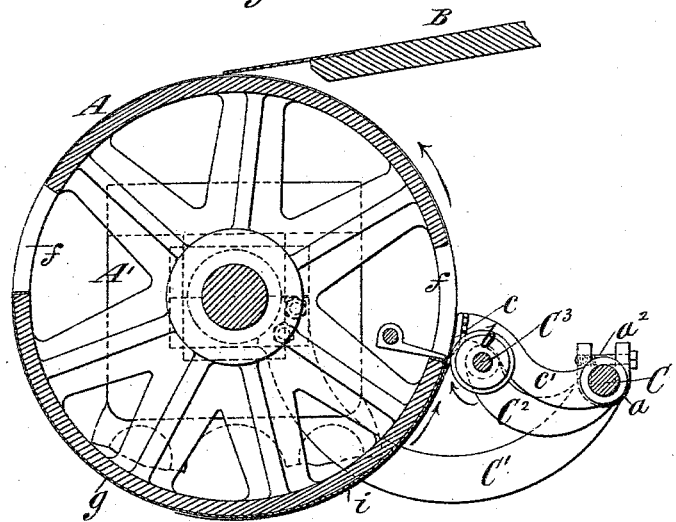
Figure 4:
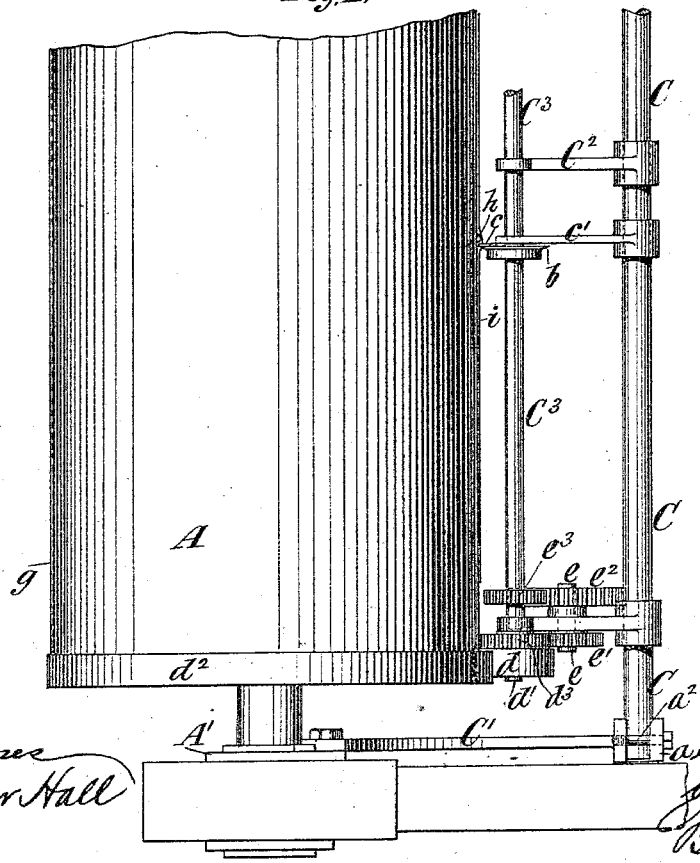

In the accompanying drawings, Figure 1 is an end view of an impression-cylinder having my improved cutting apparatus applied thereto. Fig. 2 is a horizontal section of a portion of the cylinder and a plan of the cutting apparatus. Fig. 3 is a transverse vertical section of the cylinder and cutting apparatus on the dotted line $x$ $x$, Fig. 2. Fig. 4 is a plan of the cylinder and said apparatus. Fig. 5 is a detail view hereinafter referred to. Fig. 6 is a view similar to Fig. 3 of the cutting apparatus and adjacent portion of the cylinder on a very much larger scale. Fig. 7 is a view similar to Fig. 2 of the cutting apparatus and adjacent portion of the cylinder on the same scale as Fig. 6. Fig. 8 is a view similar to Fig. 6 illustrating a modification of my invention. Fig. 9 is a section on the line $z$ $z$, Fig. 8, illustrating a stationary blade; and Fig. 10 is a sectional view on the dotted line 2 2, Fig. 8.

Similar letters of reference designate corresponding parts in all the figures.

Referring, first, to all figures except 8, 9, and 10, A designates the impression-cylinder, and B the feed-board.

My improved cutting apparatus is designed to cut the paper in a direction circumferentially of the cylinder while it is upon the cylinder and before being delivered.

I have here shown the apparatus as arranged beneath the feed-board B, and after the paper has been cut it may be delivered by any suitable delivery apparatus.

I have not here shown any delivery apparatus, as it forms no part of my invention.

C designates a fixed or non-rotary bar, which is supported by means of arms or brackets C'.

In a stop-cylinder press, the arms or brackets might extend from a fixed part of the frame of the press; but in a two-revolution press the said arms or brackets should extend from the cylinder-boxes, so that they and the bar C, which they support, will rise and fall with the cylinder. I have here shown the said arms or brackets as bolted securely to the cylinder-boxes A', and the ends of the bar C are flattened and fit in corresponding U-shaped bearings, $a$, in the arms C', wherein they are held by pins $a^2$ or other suitable means. From the bar C arms or hangers $C^2$ extend toward the cylinder and support a rotary shaft, $C^3$, which extends lengthwise of the cylinder and parallel therewith.

I do not here show the full length of the cylinder or the full length of the bar C and shaft $C^3$; but two hangers or arms, $C^2$, may be placed at the ends of the cylinder, and one or more hangers or arms may be arranged between the ends thereof, as shown. A bracket, C', is employed at each end of the cylinder to support the bar C.

Upon the shaft $C^3$ is secured a rotary blade or cutter, $b$, and said shaft should be so arranged relatively to the cylinder A that the edge of the rotary cutter $b$ will barely touch the surface of the cylinder blanket or tympan, and will not cut the latter.

Adjacent to the cutting-edge of the rotary blade $b$ is a stationary pointed cutter or blade, $c$, secured to an arm, $c'$, which projects from the bar C. The stationary cutter or blade is arranged close to or against the cylinder, with its point projecting downward, and it lies close to the rotary cutter $b$. As the cylinder A rotates, the point of the cutter $c$ introduces itself under the paper and lifts it from the cylinder very slightly, but sufficiently to hold the paper against the cutting-edge of the blade $b$. The two blades or cutters $b\ c$ act in conjunction to slit or cut the paper, and this result is attained with a certainty that is impossible where the cutting is effected by a single knife or cutting-disk arranged to press against the paper on the cylinder.

In order to rotate the knife or cutter $b$, I may employ gearing shown in Figs. 1, 2, and 4.

The arm or hanger $C^2$, employed to support one end of the shaft $C^3$, not only constitutes a bearing for said shaft, but it is also provided with bearings for two short shafts, $d\ e$.

On one end of the short shaft $d$ is a wheel, $d'$, which may be covered with rubber or other elastic material, and which bears against the circular bearer $d^2$ at the end of the cylinder, and receives a constant rotary motion by frictional engagement therewith. Upon the other end of the short shaft $d$ is secured a spur-wheel, $d^3$, which gears with a pinion, $e'$, on the one end of the shaft $e$, and on the opposite end of the said shaft $e$ is a spur-wheel, $e^2$, gearing into a pinion, $e^3$, on the shaft $C^3$.

By means of the gearing described the rotary cutter $b$ is caused to travel in the same direction as the adjacent surface of the cylinder A and at a speed faster than that of the cylinder.

In the cylinder A is the usual gripper-recess, $f$, two being here shown, and the cylinder blanket or tympan $g$ is confined at the receiving-edge of each recess by the usual tympan-bar and grippers, $g'\ g^3$, as shown in Fig. 2, and also in Fig. 5, which represents in detail and on a larger scale a portion of the receiving-edge of the cylinder and the tympan-grippers. When once the sharp point of the stationary cutter or blade $c$ is introduced under the sheet of paper at the receiving-edge of the cylinder, it will there remain until the entire sheet is slit or cut in two; but in order to first get said cutter or blade under the paper, the latter must be raised slightly from the cylinder at the receiving-edge of the cylinder, so that the edge of the sheet will pass over and not under the point of said cutter or blade. This may be effected by attaching little lumps or projections $h$ to the blanket $g$ at the receiving-edge and adjacent to those points where the cutters are to act. Such lumps or projections may be attached or applied to the ends of the tympan-grippers, as shown in Figs. 5 and 2, and whether they are attached to the blanket, as shown in Figs. 6 and 7, or to tympan-grippers, the result will be substantially the same. The lump or projection $h$ may be formed by a bit of paper or card-board gummed to the tympan-grippers, or to the blanket directly.

The relative arrangement of the cylinder and cutters $b\ c$ will be best understood from Figs. 6 and 7, which are on a very large scale, a portion of the cylinder only being shown. The stationary cutter or blade and the rotary blade are arranged side by side, as shown in Fig. 7, and together they form shears, one member or blade of which is rotary. The lump or projection $h$ being nearly in range with the sharp-pointed cutter or blade $c$, as shown in Fig. 7, will hold the sheet of paper $i$ sufficiently away from the cylinder to insure the introduction of the cutter $c$ under it. When the rotary cutter $b$ is made to travel at a higher speed than the peripherical velocity of the cylinder, it will insure a drawing cut or action of the said rotary cutter, and hence the cutting is effected smoothly and without tearing the paper, although it is damp and hard to cut.

The direction of rotation of the cylinder A and rotary cutter $b$ are indicated by arrows in Fig. 6. Only one pair of blades or cutters, $b\ c$, are shown; but another pair or other pairs may be arranged along the cylinder, and the one pair shown may be adjusted and secured in any position desired.

Referring now to Figs. 8, 9, and 10, A designates a portion of the impression-cylinder, which is designed to rotate in the direction of the arrow, Fig. 8, and $g$ designates the blanket or tympan, which is held thereon by the tympan-bar and grippers $g'\ g^2$, as in the example of my invention before described.

$b$ designates the rotary blade or cutter, fast on the shaft $C^3$, and which is rotated in the direction of the arrow by the mechanism before described.

The stationary blade in this example of the invention consists of a thin piece of steel, $c^2$, secured by a supporting-shank, $c^3$, to the fixed arm $c'$. This blade bears flatwise against the cylinder A, and is preferably curved vertically, as shown in Fig. 8, so as to approximate to the curvature of the cylinder. Its lower edge is preferably rounded, as shown in Fig. 9, and its opposite vertical edges are also thinned, as shown in Fig. 10, so that it will introduce itself readily between the paper $i$ and the blanket $g$ on the cylinder without the necessity of employing the small projections $h$, before described, to raise the paper from the cylinder.

In the lower portion of the blade $c^2$ is a slot, $c^4$, into which the edge of the rotary blade $b$ projects very slightly, and in conjunction with one side of which the rotary blade acts, as shown in Fig. 10. The shank $c^3$, which supports the blade $c^2$, is inserted through the blade from the rear side thereof, and is riveted slightly at the front of the blade, thus securing the blade firmly thereon. The shank $c^3$ is very thin, as shown in Fig. 9, and is in the same vertical plane as the edge of the rotary blade $b$ and the side of the slot $c^4$, in conjunction with which the rotary blade acts. The shank $c^3$ is tapered downwardly, as also shown in Fig. 9, so as to give it a very thin edge. The paper $i$ is cut by the rotary blade or cutter $b$, and the shank $c^3$ is so thin that the two cut portions of the paper pass readily on opposite sides of the shank and are not materially spread or rumpled.

I am aware of Letters Patent No. 178,597, granted June 13, 1876, to William H. H. Clague, for trimming mechanism for printing-presses. The mechanism shown in said patent consists of a band of metal secured on the cylinder and a circular knife or cutter, the edge of which works closely against the side of the metal band, and acts in connection with said band to trim the edge of the sheet.

I am aware of Letters Patent No. 243,767, dated July 5, 1881, and granted to J. Flanders, for machinery for slitting paper. The mechanism in this patent consists of a metal band placed circumferentially around the cylinder, outside of the blanket or tympan, and a rotary cutter under which the paper passes, and which severs the paper by pressure upon the metal band.

I do not desire to include in my invention the mechanism for cutting paper shown and described in the aforesaid Letters Patent; but

What I claim as my invention, and desire to secure by Letters Patent, is—

1. The combination, with a rotating impression-cylinder, of a stationary blade or cutter arranged close to or against the periphery of the cylinder, to be introduced under the paper thereon, and a rotary blade or cutter for acting on the paper from the outside thereof, and operating in conjunction with said stationary blade or cutter with a shearing action, substantially as and for the purpose herein described.

2. The combination, with a rotating impression-cylinder, of a stationary blade or cutter to be introduced under the paper, and a rotary blade or cutter for acting on the outside of the paper in conjunction with said stationary cutter or blade, and having its rotary motion in the same direction as the adjacent portion of the cylinder and at a greater speed, substantially as and for the purpose herein described.

3. The combination, with a rotating impression-cylinder, of a stationary blade to be introduced flatwise under the paper, and having a vertical slot and a rotary blade or cutter arranged opposite said slot, for acting on the outside of the paper with a shearing action, substantially as and for the purpose herein described.

4. The combination, with the cylinder A, of the stationary blade $c^2$, provided with the thin supporting-shank $c^3$, and the slot $c^4$, both in the same vertical plane, and the rotary blade or cutter $b$, substantially as and for the purpose herein described.

C. B. COTTRELL.

Witnesses:
FREDK. HAYNES,
MAT POLLOCK.